United States Patent
Takahashi (10) Patent No.: US 12,316,916 B2
(45) Date of Patent: May 27, 2025

(54) WEARABLE DEVICE

(71) Applicant: SHIMADZU CORPORATION, Kyoto (JP)

(72) Inventor: Noriko Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/861,696

(22) Filed: Jul. 11, 2022

(65) Prior Publication Data

US 2023/0101110 A1  Mar. 30, 2023

(30) Foreign Application Priority Data

Sep. 29, 2021  (JP) ................. 2021-159339

(51) Int. Cl.
*H04N 21/472* (2011.01)
*G02B 27/01* (2006.01)

(52) U.S. Cl.
CPC ... *H04N 21/47217* (2013.01); *G02B 27/0101* (2013.01); *G02B 27/017* (2013.01); *H04N 21/47202* (2013.01); *G02B 2027/0138* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 2005/0231599 A1* | 10/2005 | Yamasaki | ........... | H04N 9/8042 348/E5.025 |
| 2016/0171772 A1* | 6/2016 | Ryznar | ............... | G02B 27/0093 345/633 |
| 2019/0370544 A1* | 12/2019 | Wright, Jr. | ................. | G06T 7/20 |
| 2021/0313052 A1* | 10/2021 | Makrinich | ........... | G06V 10/764 |

FOREIGN PATENT DOCUMENTS

| | | |
|---|---|---|
| CN | 101179711 A | 5/2008 |
| CN | 105103068 A | 11/2015 |
| JP | 2008118526 A | 5/2008 |
| JP | 2014143595 A | 8/2014 |
| JP | 2014197802 A | 10/2014 |
| JP | 2015-139017 A | 7/2015 |

(Continued)

OTHER PUBLICATIONS

Notice of Reasons for Refusal for Japanese Patent Application No. 2021-159339, dated Nov. 5, 2024 (with English-language translation of the same).

(Continued)

*Primary Examiner* — Heather R Jones
(74) *Attorney, Agent, or Firm* — Muir Patent Law, PLLC (57) ABSTRACT

Smart glasses are provided with an imaging unit for imaging a working scene of a worker, a display unit, a controller for controlling a display of the display unit, and an input device configured to receive an input of a playback instruction to instruct a playback of a video obtained by imaging the working scene. The controller causes the display unit to display the video from a first time point in response to an input of the playback instruction. The first time point is a time point that goes back by a first period from the playback instruction.

10 Claims, 4 Drawing Sheets

(56) References Cited

FOREIGN PATENT DOCUMENTS

| | | |
|---|---|---|
| JP | 2019032593 A | 2/2019 |
| JP | 2020-047298 A | 3/2020 |
| JP | 2020-178831 A | 11/2020 |

OTHER PUBLICATIONS

Chinese Office Action, dated Mar. 26, 2025, issued from The State Intellectual Property Office of People's Republic of China, for corresponding Chinese Application No. CN 202211107186.1, and machine translation thereof.

Japanase Office Action, dated Feb. 12, 2025, issued from the Japanese Patent Office for corresponding Japanese Application No. JP 2021-159339, and machine translation thereof.

* cited by examiner

WEARABLE DEVICE

CROSS-REFERENCE TO RELATED APPLICATIONS

This application claims priority under 35 U.S.C. § 119 to Japanese Patent Application No. 2021-159339 filed on Sep. 29, 2021, the entire disclosure of which is incorporated herein by reference in its entirety.

BACKGROUND OF THE INVENTION

Field of the Invention

The present disclosure relates to a wearable device.

Description of the Background Art

In recent years, there has been an increasing number of cases in which a worker is engaged in work in a state of wearing a wearable device having a video imaging function to image the vicinity of the hands of the worker during the work. In one embodiment, a video captured by a wearable device is viewed by an administrator to confirm the work contents of the worker.

Japanese Unexamined Patent Application Publication No. 2020-47298 discloses a glasses-type wearable device having a video imaging function.

However, a conventional wearable device, such as, e.g., a wearable device disclosed in Japanese Unexamined Patent Application Publication No. 2020-47298, does not have a mechanism for the worker to easily look back on his/her own work at the desired timing. When a worker repeats the same work or is immersed in work, in some cases, the worker will become a state in which the worker is unable to know to what extent the worker has completed the work. It is psychologically burdensome for the worker to proceed with the work without knowing its progress. In addition, advancing the work without confidence in the progress of the work may interfere with the quality of the work. Therefore, there is a need for a mechanism that allows a worker to easily look back on his/her own work at the desired timing.

SUMMARY OF THE INVENTION

The present disclosure has been made in view of the above-mentioned circumstances. An object of the present disclosure is to provide a wearable device in which a worker can easily review his/her own work at the desired timing.

A wearable device according to the present disclosure is provided with:
  an imaging unit configured to image a working scene of a worker;
  a display unit;
  a controller configured to control a display of the display unit; and
  an input unit configured to input a playback instruction to instruct a playback of a video obtained by imaging the working scene.

The controller is configured to cause the display unit to display the video from a first time point in response to an input of the playback instruction.

The first time point is a time point that goes back by a first period from the playback instruction.

The above-described objects and other objects, features, aspects, and advantages of the present invention will become apparent from the following detailed descriptions of the present invention that can be understood with reference to the attached drawings.

DESCRIPTION OF THE PREFERRED EMBODIMENT

Hereinafter, some embodiments of the present invention will be described in detail with reference to the attached drawings. The same or corresponding portion in the drawings is denoted by the same reference numeral, and the description thereof will not be repeated. Embodiments and modifications thereof described below may be selectively combined as appropriate.

Figure 1:
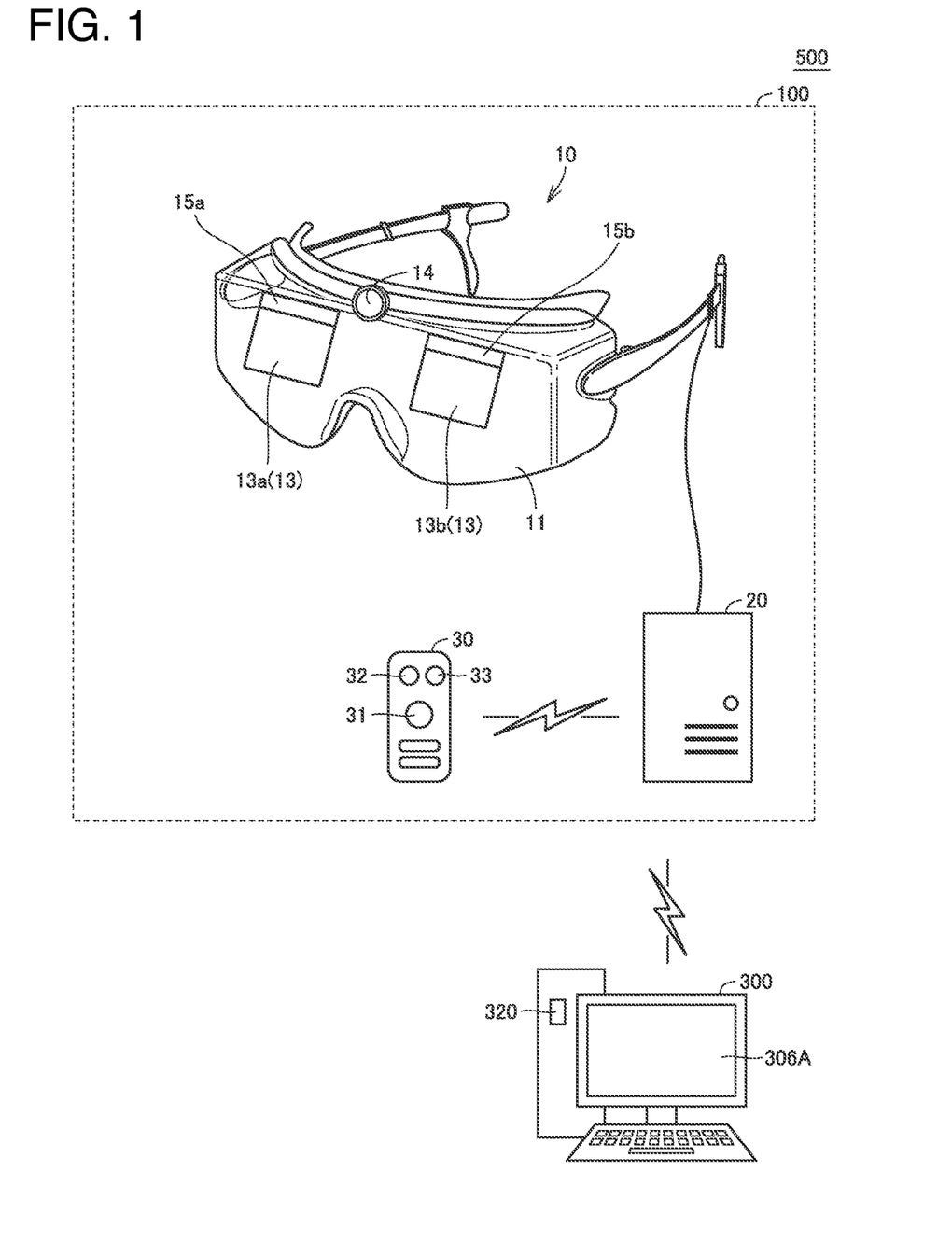
FIG. 1 is a diagram schematically showing a recording system including a wearable device according to an embodiment.

FIG. 1 is a diagram schematically showing a recording system including a wearable device according to this embodiment. The recording system 500 is provided with smart glasses 100 and an external device 300. The smart glasses 100 are one example of the "wearable device" recited in the claims. The external device 300 is, for example, a server, a terminal used by an administrator, or the like. The smart glasses 100 and the external device 300 can communicate with each other by wired communication or radio communication.

The smart glasses 100 are provided with a main body 10, a controller 20, and the input device 30. The main body 10 is provided with a transparent protective glass 11 for protecting eyes. Further, the worker can visually recognize the scene ahead of the worker in a state of wearing the main body 10. The main body 10 is provided with a transparent display 13. The display 13 is one example of the "display unit" recited in the claims.

An image (e.g., a work video which will be described below) is displayed on the display 13. The display 13 includes a display 13a on the right eye side and a display 13b on the left eye side. The display 13a on the right eye side is attached to the protective glass 11 via a mounting portion 15a on the right eye side. The display 13b on the left eye side is attached to the protective glass 11 via a mounting portion 15b on the left eye side. The worker can visually recognize the scene ahead of the worker through the display 13 and can also view the image displayed on the display 13.

Further, the main body 10 is provided with an imaging unit 14. The imaging unit 14 images the working scene of the worker who is working in a state of wearing the main body 10. Specifically, the imaging unit 14 images the vicinity of the hands of the worker ahead of the worker's line of sight. The work video captured by the imaging unit 14 is stored in a storage device 320 of the external device 300 as the work log for quality-assurance purposes. The work video stored in the storage device 320 is viewed on the display 306A primarily by the administrator who administers the work.

The controller 20 generally controls the entire smart glasses 100. Specifically, the controller 20 controls imaging by the imaging unit 14. Further, the controller 20 controls the display of the display 13. Further, the controller 20 transmits the work video to the external device 300.

The input device 30 is one example of the "input unit" recited in the claims. Various instructions to the controller 20 are inputted to the input device 30 by the worker. The input device 30 includes at least one or more of buttons, a touchpad, and a microphone. In the embodiment shown in FIG. 1, the input device 30 includes at least one button 31. The button 31 is an operation switch for inputting an instruction on the playback of the work video on the display 13.

More specifically, the button 31 is an operation switch for inputting a playback instruction to instruct the playback of the work video and a termination instruction to instruct the termination of the playback of the work video. The worker can input the playback instruction by operating the button 31 when the work video is not being played back on the display 13. When the playback instruction is inputted, the work video from the first time point, which is a time point that goes back by a first period from the playback instruction, is displayed on the display 13. The first period is long enough to look back on the most recent working scene and depends on the work contents. The first period is specified by time (e.g., three minutes). The first period may be predetermined or specified by the worker or the administrator.

Further, the worker can also input a termination instruction by operating the button 31 when the work video is being played back on the display 13. When the termination instruction is inputted, the display of the work video on the display 13 is terminated.

Thus, according to the smart glasses 100, by inputting the playback instruction at the desired timing, the worker can cause the display 13 to display the work video from the first time point which is a time point that goes back by a first period from the playback instruction, i.e., the work video immediately before the playback instruction, among a series of work videos captured for the purpose of quality assurance. Therefore, the worker can easily look back on his/her own work at the desired timing.

Figure 2:
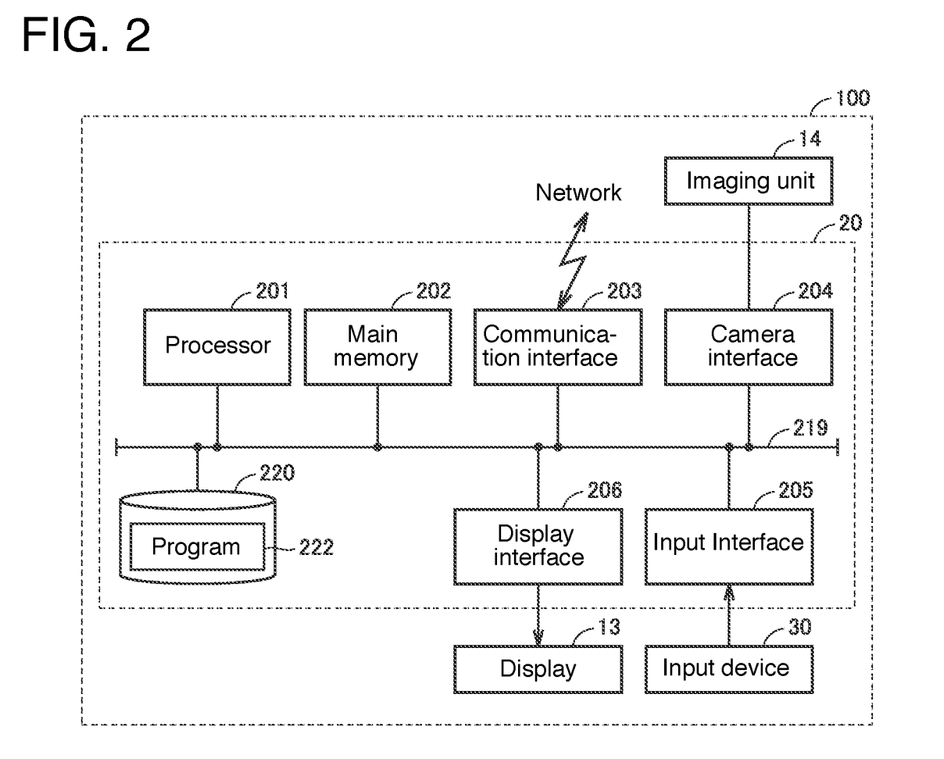
FIG. 2 is a diagram showing an example of a configuration of a controller of the wearable device according to an embodiment.

FIG. 2 is a diagram showing one example of the configuration of the controller of the wearable device according to this embodiment.

The controller 20 includes a processor 201, a main memory 202, a communication interface 203, a camera interface 204, an input interface 205, a display interface 206, and a storage device 220. These components are communicatively connected to each other via the internal bus 219.

The processor 201 is configured by, for example, at least one integrated circuit. The integrated circuit is configured by, for example, at least one CPU (Central Processing Unit), at least one ASIC (Application Specific Integrated Circuit), at least one FPGA (Field Programmable Gate Array), or the combinations thereof.

The processor 201 is one example of the "controller" recited in the claims. The processor 201 realizes various processing according to this embodiment by developing and executing the program 222 stored in the storage device 220 on the main memory 202. The main memory 202 is configured by a volatile memory and functions as a work memory required for the processor 201 to execute programs.

The communication interface 203 is one example of the "communication unit" recited in the claims. The communication interface 203 communicates with the external device 300 via a network. As one example, the communication interface 203 transmits the work video obtained by imaging with the imaging unit 14 to external device 300. The timing at which the work video is transmitted to the external device 300 may be, for example, during charging of the smart glasses 100 or at the timing at which the worker instructed by the input device 30.

The camera interface 204 relays the data transmission between the processor 201 and the imaging unit 14. More specifically, the camera interface 204 outputs a signal for instructing the imaging unit 14 to start imaging in accordance with a command from the processor 201. Further, the camera interface 204 receives an image (for example, a work video or the like) obtained by imaging from the imaging unit 14 and outputs the received image to the processor 201. Further, the camera interface 204 outputs a signal for instructing the termination of imaging to the imaging unit 14 in accordance with a command from the processor 201.

The input interface 205 relays the data transmission between the processor 201 and the input device 30. More specifically, the input interface 205 receives various instructions, such as, e.g., instructions for the playback of the work video, given by the operation of the input device 30.

The display interface 206 relays the data transmission between the processor 201 and the display 13. Specifically, the display interface 206 outputs a signal for displaying various types of information (e.g., the work video, etc.) to the display 13, in accordance with a command from the processor 201. Further, the display interface 206 outputs a signal for instructing the termination of the display to the display 13, in accordance with a command from the processor 201.

The storage device 220 is one example of the "storage unit" recited in the claims. The storage device 220 is, for example, an SSD (Solid State Drive) or a hard disk. The storage device 220 stores programs 222 for realizing various processing according to this embodiment. Further, the storage device 220 stores the work video obtained by imaging with the imaging unit 14.

The program 222 may be provided as a part of an arbitrary program rather than as a single program. In this instance, the processing according to this embodiment is realized in cooperation with an arbitrary program. A program that does not include such a part of a module does not depart from the spirit of the smart glasses 100 according to this embodiment. Further, some or all of the functions provided by the program 222 may be realized by a dedicated hardware.

Figure 3:
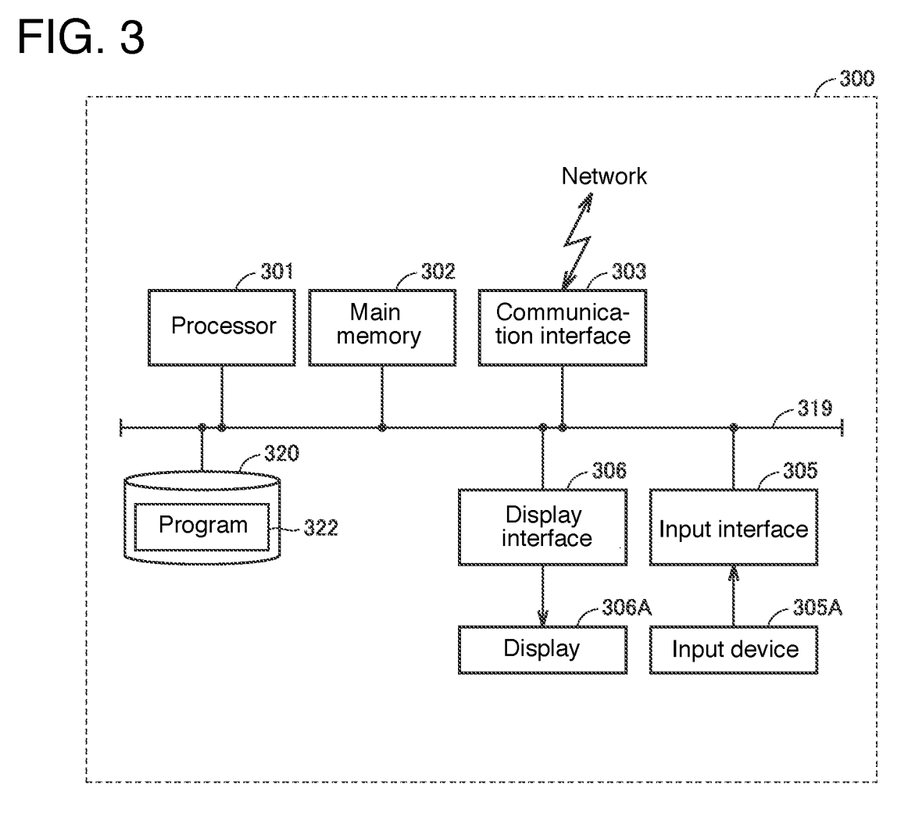
FIG. 3 is a diagram showing an example of a configuration of an external device according to an embodiment.

FIG. 3 is a diagram showing one example of a configuration of an external device in this embodiment.

The external device 300 includes a processor 301, a main memory 302, a communication interface 303, an input interface 305, a display interface 306, and a storage device 320. These components are communicatively connected to each other via an internal bus 319.

The processor 301 is configured by, for example, at least one integrated circuit. The integrated circuit is configured by, for example, at least one CPU, at least one ASIC, at least one FPGA, or the combinations thereof.

The processor 301 realizes various processing according to this embodiment by developing and executing the program 322 stored in the storage device 320 on the main memory 302. The main memory 302 is configured by a volatile memory and functions as a work memory required to execute the program by the processor 301.

The communication interface 303 communicates with the smart glasses 100 via a network. As one example, the communication interface 303 receives the work video obtained by imaging with the imaging unit 14 from the smart glasses 100.

The input interface 305 relays the data transmission between the processor 301 and the input device 305A. More specifically, the input interface 305 receives various instructions given by the operation of the input device 305A.

The display interface 306 relays the data transmission between the processor 301 and the display 306A. Specifically, the display interface 306 outputs a signal for displaying various types of information (e.g., the work video, etc.) to the display 306A in accordance with a command from the processor 301. Further, the display interface 306 outputs a signal for instructing the termination of a display to the display 306A in accordance with the command from the processor 301.

The storage device 320 may be, for example, an SSD or a hard disk. The storage device 320 stores a program 322 for realizing various processing according to this embodiment. Further, the storage device 320 also stores the work video received from the smart glasses 100.

The program 322 may be provided as a part of an arbitrary program rather than as a single program. In this instance, the processing according to this embodiment is realized in cooperation with an arbitrary program. Note that a program that does not include a part of a module does not depart from the spirit of the external device 300 according to this embodiment. Further, a part or all of the functions provided by the program 322 may be realized by dedicated hardware.

Figure 4:
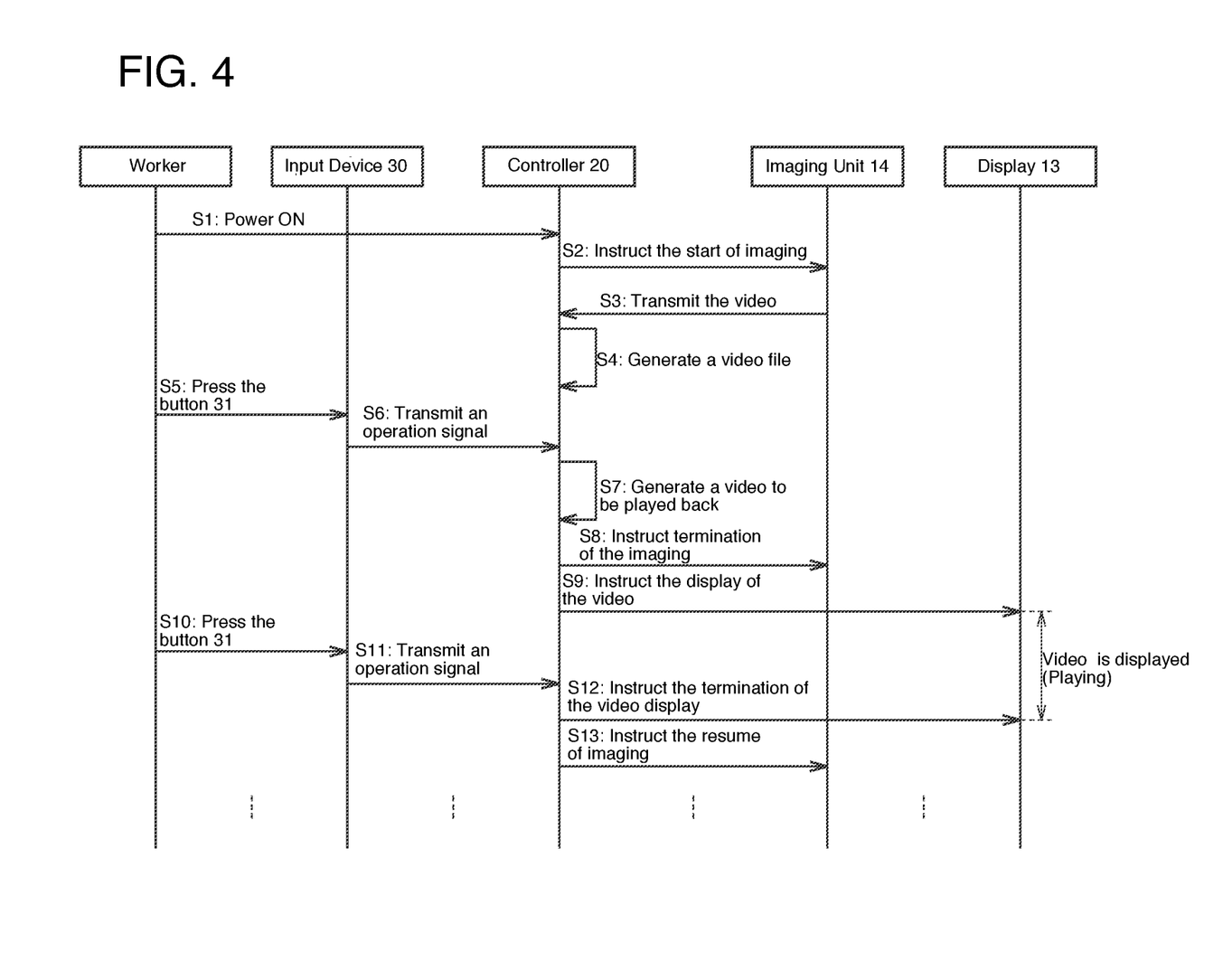
FIG. 4 is a diagram showing an example of processing related to recording and a playback of a work video of the wearable device according to an embodiment.

FIG. 4 is a diagram showing an example of processing related to recording and a playback of a work video of the wearable device according to this embodiment. In Step S1, a worker wears the glasses 100 and turns on the power of the smart glasses 100, i.e., activates the smart glasses 100.

In Step S2, the processor 201 of the controller 20 instructs the imaging unit 14 to start imaging in response to the power-on of the smart glasses 100. With this, the imaging unit 14 starts imaging.

In Step S3, the imaging unit 14 transmits the work video obtained by imaging at any time to the controller 20.

In Step S4, the processor 201 generates a video file in which the work video received from the imaging unit 14 is associated with the imaging time and stores the video file in the storage device 220.

In Step S5, the worker operates (presses) the button 31. In Step S6, the input device 30 transmits an operational signal indicating that the button 31 has been operated to the controller 20.

The processor 201 determines that a playback instruction has been inputted in response to that an operation signal indicating that the button 31 has been operated by the input device 30 when a video is not being played back. In Step S7, the processor 201 refers to the video file generated in Step S4 and generates a video for playback. The video for playback is a work video from the first time point that goes back by a first period from the playback instruction among a series of work videos.

In Step S8, the processor 201 instructs the imaging unit 14 to stop imaging. With this, the imaging unit 14 stops imaging.

In Step S9, the processor 201 instructs the display 13 to display the work video generated in Step S7. With this, the work video from the first time point is displayed on the display 13.

In Step S10, the worker operates (presses) the button 31. In Step S11, the input device 30 transmits an operational signal indicating that the button 31 has been operated to the controller 20.

The processor 201 determines that a termination instruction has been inputted in response to that the operation signal indicating that the button 31 has been operated at the input device 30 when a video is being played back. In Step S12, the processor 201 instructs the display 13 to terminate the display of the work video which is being played back. With this, the display of the work video on the display 13 is completed.

In Step S13, the processor 201 instructs the imaging unit 14 to resume imaging. With this, the imaging unit 14 resumes imaging.

After Step S13, the processing from Step S3 to Step S13 is repeated until the power of the smart glasses 100 is turned off.

Note that in the processing shown in FIG. 4, the imaging by the imaging unit 14 is started in response to the activation of the smart glasses 100, but the present invention is not limited thereto. As an alternative example, it may be configured such that an imaging start button for instructing a start of imaging by the imaging unit 14 is provided at the input device 30 and that imaging by the imaging unit 14 is initiated in response to the operation of the imaging start button after the activation of the smart glasses 100. In a case where imaging by the imaging unit 14 is started in response to the activation of the smart glasses 100, the worker is not required to instruct the start of imaging, which can prevent the recording from being forgotten. Further, in a case where imaging by the imaging unit 14 is started in response to the operation of the imaging start button, it may be configured such that an alarm may be outputted in response to the fact that imaging has not been started within a predetermined time from the activation of the smart glasses 100, or in response to the fact that imaging has not been started when a work instruction (including a work procedure manual or the like) is displayed. Outputting an alarm prevents the recording from being forgotten.

Further, in the processing shown in FIG. 4, the imaging unit 14 stops the imaging when a video is being played back, but the imaging may be continued even when the video is being played back.

Further, in the processing shown in FIG. 4, although the worker can terminate the display of the work video on the display 13 by operating the button 31 when the video is being played back, it may be configured such that the display of the work video cannot be terminated in the middle of the display of the work video. In this instance, the processing of Step S13 is executed after the work video up to the time when the playback instruction is inputted is displayed on the display 13.

As described above, the smart glasses 100 is provided with the imaging unit 14 for imaging the working scene of the worker and displays the work video from the first time point that goes back by the first period from the playback instruction on the display 13 in response to the input of the playback instruction. Therefore, the worker can look back on his/her own work to confirm to what extent the worker has completed the work.

Further, according to the smart glasses 100, the worker can input the playback instruction by operating the button 31 at the desired timing. The worker can, therefore, look back on his/her own work at the desired timing.

Further, according to the smart glasses 100, the work video from the first time point is displayed on the display 13 in response to the input of the playback instruction. This eliminates the need for the worker to close the screen of the currently viewing display 13, open the video file selection window, open the appropriate video file, and locate the work scene from the first time point. The worker can, therefore, easily look back on his/her own work.

In other words, according to the smart glasses 100, the worker can easily look back his/her own work at the desired timing. Therefore, the worker's psychological burden can be reduced because the worker can clarify the progress of the work and proceed with the work. Further, the work can be restrained from being proceeded in a state in which the progress of the work is unknown, and therefore, the quality of the work can be improved.

Modification 1

In a case where a work performed by a worker includes a plurality of processes, the input device 30 may further include a start button for inputting the starting point of each process and an end button for inputting the termination point of each process. In such a case, the worker operates the start button at the beginning of the work in each process and operates the end button at the end of the work in each process. With this, the processor 201 can specify the break in each process. Therefore, in Step S4 shown in FIG. 4, the processor 201 can generate a video file chaptered for each work process.

In a case where a video file chaptered for each work process is generated, the first period may be specified by the number of processes of the work. For example, in a case where the first period is specified by one process, the processor 201 instructs the display 13 to display the work video from the start point of a process preceded by one process from the process in which the playback instruction has been inputted, in response to the input of the playback instruction. With this, the work video from the start point of the process preceded by one process from the process in which the playback instruction has been inputted is displayed on the display 13.

Modification 2

The first period may be specified by the worker or the administrator by using the input device 30. As one example, for any button provided at the input device 30, the time specified by one operation of the button or the number of processes of the work has been predetermined. The processor 201 sets the time corresponding to the number of operations of the button or the number of processes of the work to the first period.

As one example, it is assumed that the time specified by one operation of the button is set to one minute. In such a case, in response to that the button has been successively operated twice, the processor 201 sets the first period to two minutes (one minute×two times).

As another example, it is assumed that the number of processes specified by one operation of the button is set to one. In such a case, the processor 201 sets the first period to one process in response to one operation of the button.

Modification 3

The input device 30 may further include a button 32 (see FIG. 1) for inputting a first instruction to return the work video which is being played back to a second time point and a button 33 (see FIG. 1) for inputting a second instruction to advance the work video which is being played back to a third time point. In such a case, the work video which is being played back can be easily played backward or forward.

In detail, when the button 32 is operated during the playback of the work video, the processor 201 determines that the first instruction has been inputted and instructs the display 13 to display the work video from the second time point that goes back by the second period from the first instruction. With this, the work video is displayed from the second time point on the display 13.

Further, when the button 33 has been operated during the playback of the work video, the processor 201 determines that the second instruction has been inputted and instructs the display 13 to display the work video from the third time point that goes forward from the second instruction by the third period. With this, the work video from the third time point is displayed on the display 13.

Note that the second period and the third period are specified by time. Further, in a case where a video file chaptered for each work process is generated, the second period and the third period may be specified by the number of processes of the work. Further, the second period and the third period each may be predetermined or specified by the worker or the administrator. Further, in a case where the second period and the third period are each specified by the worker or the administrator, they may be specified by using the specification methods described in Modification 2.

Further, the second period and the third period may be different from each other or may be the same. In a case where the second period and third period differ from each other, for example, the second period is set to 1 minute and the third period is set to 30 seconds. In a case where the second period and the third period differ from each other, the work video which is being played back can be more flexibly played forward or backward as compared with the case in which the second period and the third period are the same. It is, therefore, easier to reach the desired work scene.

Modification 4

The controller 20 may further include an interface connectable to a secondary storage device, such as, e.g., an USB (Universal Serial Bus) memory. In such a case, the work video may be stored in the auxiliary storage device instead of the storage device 220. With this, it is possible to reduce the storage capacity required for the storage device 220.

Modification 5

In the above-described embodiment, although a binocular display is adopted as the display unit, a uniocular display may be adopted. In a case where a binocular display is adopted as the display unit, the fatigue of the user's eye can be reduced even when viewing a high-resolution image. On the other hand, in a case where a uniocular display is adopted as the display unit, it is possible to reduce the weight of the main body 10. Further, the display 13 may or may not be detachable from the protective glass 11. Further, the display 13 may display not only the work video but also a work procedure and a checklist. Further, as the display unit, a screen may be adopted instead of the display. In a case where a screen is adopted as the display unit, the main body 10 is provided with a projection unit that projects a video on a screen. The processor 201 controls the projection by the projection unit, thereby controlling the display of the screen.

Modification 6

In the above-described embodiment, although the controller 20 is provided in a housing different from the main body 10, the controller 20 may be provided in the same housing as the main body 10. Further, in the above-described embodiment, the input device 30 is provided in a housing different from the main body 10 but may be provided in the same housing as the main body 10.

Modification 7

In the above-described embodiment, the wearable device is a wearable device (smart glasses) of the eyeglass type (including the goggle type) but may be a helmet-type wearable device. Further, the wearable device is not limited to a head-mounted type, such as, e.g., an eyeglass type and a helmet-type, and may be a wristband type or a pendant-type wearable device.

[Aspects]

It will be appreciated by those skilled in the art that the above-described exemplary embodiments are illustrative of the following aspects.

(Item 1)

A wearable device according to an embodiment includes:
an imaging unit configured to image a working scene of a worker;
a display unit;
a controller configured to control a display of the display unit; and
an input unit configured to input a playback instruction to instruct a playback of a video obtained by imaging the working scene.

The controller is configured to cause the display unit to display the video from a first time point in response to an input of the playback instruction.

The first time point is a time point that goes back by a first period from the playback instruction.

According to the wearable device as recited in the above-described Item 1, in response to an input of a playback instruction, the work video from the first time point which is a time point that goes back by a first period from the playback instruction is displayed on the display unit. Therefore, the worker can look back on his/her own work and confirm to what extent the worker has completed the work. Further, according to the wearable device as described in Item 1, the worker can input a playback instruction by operating the input unit at the desired timing. The worker can, therefore, look back on his/her own work at the desired timing. Further, according to the wearable device as recited in the above-described Item 1, the work video from the first time point is displayed on the display unit in response to the input of the playback instruction. This eliminates the need for the worker to locate the work scene at the first time point from a series of work videos. The worker can, therefore, easily look back on his/her own work.

(Item 2)

In the wearable device as recited in the above-described Item 1, the imaging unit starts imaging in response to activation of the wearable device.

According to the wearable device as recited in Item 2, since the worker does not need to instruct initiation of imaging, it is possible to prevent the recording from being forgotten.

(Item 3)

In the wearable device as recited in the above-described Item 1 or 2, the imaging unit stops imaging when the video is being played back.

During the playback of the work video, it is expected that the worker will not perform the work. Therefore, when looking back on the work, the video part recorded during the playback of the work video is likely to be skipped. According to the wearable device as recited in Item 3, only the work video required for looking back the work is imaged and stored. The administrator and the worker can, therefore, efficiently review the work video. Further, it is possible to prevent the wasteful use of the storage space on the storage device in which the work video is stored.

(Item 4)

In the wearable device as recited in any one of the above-described Items 1 to 3, the input unit inputs a termination instruction to instruct termination of the playback of the video. The controller terminates the display of the video on the display unit in response to an input of the termination instruction when the video is being played back.

According to the wearable device as recited in the above-described Item 4, the work video which is being played can be stopped at the desired timing of the worker. Therefore, when the worker can look back on his/her own work, it is possible to stop the work video which is being played back and return to his/her work.

(Item 5)

In the wearable device as recited in any one of the above-described Items 1 to 4, the first period is specified by a time or the number of processes of the work.

According to the wearable device as recited in the above-described Item 5, the first period can be flexibly set.

(Item 6)

In the wearable device as recited in any one of the above-described Items 1 to 5, the first period is capable of being specified by the worker or an administrator of the work.

According to the wearable device as recited in the above-described Item 6, the first period can be changed according to work contents.

(Item 7)

In the wearable device as recited in the above-described Item 6, a time or the number of processes of the work specified by a single operation of the input unit has been predetermined. The first period is specified by the number of operations of the input unit.

According to the wearable device as recited in the above-described Item 7, the first period can be easily changed.

(Item 8)

In the wearable device as recited in any one of the above-described Items 1 to 5, the first period has been predetermined.

According to the wearable device as recited in the above-described Item 8, it is possible to save the labor of specifying the first period by the worker or the administrator.

(Item 9)

In the wearable device as recited in any one of the above-described Items 1 to 8, the input unit is configured to further input a first instruction to go backward the video which is being played back to a second time point. The controller is configured to cause the display unit to display the video from the second time point in response to an input of the first instruction. The second time point is a time point that goes back by a second period from the first instruction. The input unit is configured to further input a second instruction to go forward the video which is being played back to a third time point. The controller is configured to cause the display unit to display the video from the third time point in response to an input of the second instruction. The third time point is a time point that goes forward by a third period from the second instruction.

According to the wearable device as recited in the above-described Item 9, the work video which is being played can be easily played backward or forward.
(Item 10)

In the wearable device as recited in above-described Item 9, the second period differs from the third period.

According to the wearable device as recited in the above-described Item 10, the work video which is being played back can be more flexibly moved forward or backward. It is, therefore, easier to reach the desired work scene.
(Item 11)

The wearable device as recited in any one of the above-described Items 1 to 10 is further provided with a storage unit for storing the video.

According to the wearable device as recited in the above-described Item 11, the work video can be stored in the wearable device, so there is no need to provide a separate storage device to store the work video.
(Item 12)

The wearable device as recited in any one of the above-described Items 1 to 11 is further provided with a communication unit configured to communicate with an external device. The communication unit transmits the video to the external device. The video is stored in the external device as a log of the work.

According to the wearable device as recited in the above-described Item 12, the work video can be stored in the external device, so that the memory capacity required for the storage device of the wearable device can be reduced.

Although some embodiments of the present invention have been described, the embodiments disclosed herein are to be considered in all respects as illustrative and not restrictive. The scope of the present invention is indicated by claims, and it is intended to include all modifications within the meanings and ranges equivalent to those of the claims.

The invention claimed is:

1. A wearable device comprising:
   an imaging unit configured to perform imaging of a working scene of a worker who performs one or more work contents among a plurality of work contents;
   a display unit;
   a controller configured to control a display of the display unit; and
   an input unit configured to receive input of a playback instruction by the worker to instruct a playback of a video obtained by the imaging of the working scene,
   wherein the controller is configured to cause the display unit to display the video from a first time point in response to the input of the playback instruction,
   wherein the first time point is a time point that goes back by a first period from the playback instruction,
   wherein the first period corresponds to a work content at a time of receiving the input of the playback instruction, among a plurality of first periods corresponding to the plurality of work contents, and
   wherein the first period b a constant length that is determined in advance based on the work content.

2. The wearable device as recited in claim 1,
wherein the imaging unit is configured to start imaging in response to activation of the wearable device.

3. The wearable device as recited in claim 1,
wherein the imaging unit is configured to stop imaging when the video is being played back.

4. The wearable device as recited in claim 1,
wherein the input unit is configured to further receive input of a termination instruction to instruct termination of the playback of the video, and
wherein the controller is configured to terminate the display of the video on the display unit in response to the input of the termination instruction when the video is being played back.

5. The wearable device as recited in claim 1,
wherein the first period is specified by a time or the number of processes of the work.

6. The wearable device as recited in claim 1,
wherein the first period is capable of being specified by the worker or an administrator of the work.

7. The wearable device as recited in claim 1,
wherein the input unit is configured to further receive input of a first instruction to go backward in the video which is being played back to a second time point,
wherein the controller is configured to cause the display unit to display the video from the second time point in response to the input of the first instruction,
wherein the second time point is a time point that goes back by a second period from the first instruction,
wherein the input unit is configured to further receive input of a second instruction to go forward in the video which is being played to a third time point,
wherein the controller is configured to cause the display unit to display the video from the third time point in response to the input of the second instruction, and
wherein the third time point is a time point that goes forward by a third period from the second instruction.

8. The wearable device as recited in claim 7,
wherein the second period differs from the third period.

9. The wearable device as recited in claim 1, further comprising:
a storage unit for storing the video.

10. The wearable device as recited in claim 1, further comprising:
a communication unit configured to communicate with an external device,
wherein the communication unit transmits the video to the external device, and
wherein the video is stored in the external device as a log of the work.

* * * * *